United States Patent Office 2,764,469
Patented Sept. 25, 1956

2,764,469

SOLUTIONS OF ACRYLONITRILE POLYMERS IN MIXTURES OF ETHYLENE CARBONATE AND 1:2-PROPYLENE CARBONATE

Ernest Jan Kowolik and James Wotherspoon Fisher, Spondon, near Derby, England, assignors to British Celanese Limited, a corporation of Great Britain No Drawing. Application October 7, 1953, Serial No. 384,772

Claims priority, application Great Britain October 20, 1952

14 Claims. (Cl. 18—54)

This invention relates to solutions of polyacrylonitrile and of copolymers containing acrylonitrile as the preponderating constituent, and to the production from such solutions of shaped articles such as fibres and films.

A class of polymer of increasing importance consists of polyacrylonitrile and copolymers of acrylonitrile with other unsaturated compounds, especially vinyl compounds. Examples of such other unsaturated compounds are substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; vinyl compounds containing basic nitrogen, e. g. 2-vinyl-pyridine, 2-methyl-5-vinyl-pyridine, and beta-morpholino-ethyl vinyl ether; and vinylidene chloride. Polyacrylonitrile itself and such copolymers of acrylonitrile with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

During the last few years however a number of organic liquids not usually considered as industrial solvents have been found to dissolve polyacrylonitrile under suitable conditions. Examples of such liquids are dimethyl formamide, certain lactones such as propiolactone, butyrolactone, and the valerolactones, certain cyclic anhydrides such as maleic and succinic anhydrides, and certain cyclic aliphatic carbonates, for example ethylene carbonate.

These liquids dissolve acrylonitrile polymers at elevated temperatures, the precise temperature required depending both on the particular solvent and on the composition of the polymer. For example, dimethyl formamide dissolves fibre-forming polyacrylonitrile at temperatures above about 70° C., butyrolactone dissolves it at temperatures above about 130° C., and ethylene carbonate at temperatures above about 60° C.

Ethylene carbonate is from several points of view a most desirable solvent for polyacrylonitrile, not least on account of its lack of toxicity. Moreover it can be made easily and cheaply. The relatively low temperature at which it dissolves polyacrylonitrile is also an advantage. It is therefore unfortunate that solutions of polyacrylonitrile in ethylene carbonate cannot be cooled substantially below about 35° C. without solidifying.

It is an object of the present invention to provide a solvent for polyacrylonitrile and other acrylonitrile polymers, especially such as contain more than 85% or 90%, and in particular more than 95%, of acrylonitrile, which shall in general present the same advantages as ethylene carbonate, e. g. shall be non-toxic for practical purposes and shall be capable of dissolving polyacrylonitrile at temperatures in the neighborhood of or not much higher than 60°–70° C., but which shall be capable of holding acrylonitrile and other acrylonitrile polymers in fluid solution at temperatures down to, or even below, ordinary room temperatures.

According to the invention we dissolve acrylonitrile polymers, in particular such as contain at least 85% or 90% and especially 95% or more of acrylonitrile, in mixtures of ethylene carbonate and 1:2-propylene carbonate containing between 30% and 90%, preferably between 55% and 80%, by weight of ethylene carbonate, and between 70% and 10%, preferably between 45% and 20%, by weight of the propylene carbonate. We have found that such mixtures will readily dissolve polyacrylonitrile at temperatures of about 70°–80° C. to give solutions of concentrations suitable for spinning, and that the solutions obtained can be cooled to temperatures well below 35° C. before they solidify. In particular, when the proportion of ethylene carbonate in the solvent mixture is within the preferred range of 55%–80%, solutions are obtained which can be cooled to temperatures well below room temperature (taken as about 18° C.), and in some cases below 0° C., or can be kept at room temperature for quite long periods, usually 1–3 days or more, before they solidify. These observations were most surprising, since 1:2-propylene carbonate alone does not dissolve polyacrylonitrile at temperatures below about 130° C., and when the solutions obtained are cooled, they become cloudy at about 80° C. and set solid at about 60° C. at the lowest.

The invention is particularly valuable in the manufacture of one- and two-dimensional shaped articles such as fibres and films from polyacrylonitrile, or from copolymers containing at least 95% of acrylonitrile together with a small proportion of a vinyl compound containing basic nitrogen, e. g. 2-vinyl-pyridine, 2-methyl-5-vinyl pyridine, or beta-morpholino-ethyl vinyl ether.

In the most advantageous form of the invention the acrylonitrile polymer is dissolved in a solvent mixture containing 60%–75% of ethylene carbonate. The polymer concentration preferably does not exceed about 20%, and may with advantage be between about 8% and 17.5%. At substantially higher polymer concentrations, especially with polymers containing 95%–100% of acrylonitrile, the temperature at which the solution becomes solid may be above room temperature. When the solution is to be used for the production of one- or two-dimensional shaped articles such as fibres and films by extrusion or casting methods, it is preferable that the viscosity of the polymer (measured in 1% solution of dimethyl formamide at 20° C.) should be between about 2.5 and 4.5 centistokes.

The polymer may be dissolved by maintaining it in contact with the solvent mixture, preferably with agitation, at a temperature above 70° C., e. g. between 70° and 150° C.; solution takes place readily at about 70°–80° C., and for economic reasons and for the sake of ease of operation it is usually desirable to employ temperatures within this range, or at any rate not above 100° C.

Shaped articles such as fibres and films are preferably made from the solutions of the invention by a wet- spinning or casting method, i. e. a method in which the solution is extruded or cast into a coagulating liquid which dissolves the solvent. Coagulating liquids which are suitable for use with solutions of polyacrylonitrile in ethylene carbonate alone may be used with the solutions of the present invention. Examples of such coagulants are aqueous solutions of aliphatic hydroxy compounds such as glycols, including polyalkylene glycols, and glycerol. Good results are also obtained by using as the coagulating liquid a carboxylic acid ester of boiling point above 250° C., especially a dialkyl phthalate, as described in United States application S. No. 257,198, J. Downing and J. G. N. Drewitt, filed November 19, 1951. The spinning solution and/or the coagulating liquid may be at room temperature or at a higher temperature, e. g. between about 60° and 90° C.

Fibres made in accordance with the invention are preferably orientated by stretching in order to increase their tenacity. A certain degree of stretch may be imparted to the fibres in the course of the spinning operation, but whether this is done or not, the fibres are preferably stretched by several times, e. g. by 5–15 times, their length in a subsequent operation. For example wet-spun fibres, after leaving the coagulating bath, may be wound up and washed, e. g. in the form of multifilament yarns, and then stretched while heated; for example they may be stretched in hot air, wet steam or water at a temperature above 80° C. as described in British Patent No. 636,476, or while they are passed in contact with a hot metal surface, e. g. the surface of a plate or roller kept at about 150°–220° C. To obtain a yarn of the highest tenacity it is advantageous to stretch the fibres as soon as possible after coagulation is complete; for example they may be stretched continuously with their formation, if desired after an intermediate wash, e. g. with ether or a hydrocarbon such as benzene. If the separate filaments in a multi-filament yarn show any tendency to stick together or coalesce during the stretching operation, this can generally be prevented by passing the yarn through an aqueous oil emulsion or otherwise applying an aqueous oil emulsion to the yarn before it is heated and stretched, or by carrying out the stretching operation in an aqueous oil emulsion at an elevated temperature, especially at a temperature above 80° C., as described in British Patent No. 636,476. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

The invention is illustrated by the following examples; the "parts" and proportions given are all by weight.

*Example I*

9.1 parts of a polyacrylonitrile of viscosity (in 1% solution in dimethyl formamide at 20° C.) 4.1 centistokes was added to 90.9 parts of a solvent composition containing 70% of ethylene carbonate and 30% of 1:2-propylene carbonate. The mixture was heated to 70° C. with stirring, and kept at this temperature until a clear solution had formed. This solution could be cooled to 8° C. before solidifying, and could be kept several weeks at ordinary room temperatures. It could be converted into fibres having good textile properties by extruding it into dibutyl phthalate, both the spinning solution and the dibutyl phthalate being either at 20° C. or at 70° C., and subsequently orientating the fibres so formed by stretching them.

*Example II*

12.3 parts of polyacrylonitrile of viscosity (in 1% solution in dimethyl-formamide at 20° C.) 3.0 centistokes was dissolved at 75° C. in 87.7 parts of a mixture comprising 65% of ethylene carbonate and 35% of 1:2-propylene carbonate. The solution could be cooled to −8° C. before solidifying, and underwent only a small degree of gelation after standing for 2 days at room temperature. The gel formed on cooling to −8° C., melted again at 12° C.

A 9.1% solution of the same polymer in a 70/30 mixture of ethylene carbonate and 1:2-propylene carbonate could be kept for four weeks at room temperature without solidifying.

*Example III*

A 15.3% solution of the same polymer in a 70/30 mixture of ethylene carbonate and 1:2-propylene carbonate could be cooled to 8–10° C. or kept at room temperature for 24 hours before it solidified. A similar solution in 100% ethylene carbonate solidified at 33° C., and a solution in 100% 1:2-propylene carbonate solidified at 90° C.

While the solutions of the invention are of particular value in the production of fibres and films and other one- and two-dimensional shaped articles by extrusion or casting methods, they may also be employed for other purposes, e. g. for the production of coatings of the acrylonitrile polymers.

Having described our invention, what we desire to secure by Letters Patent is:

1. Solutions of acrylonitrile polymers which are capable of being cooled to temperatures below 35° C. before solidifying, which comprise an acrylonitrile polymer having an acrylonitrile content at least 85% by weight, dissolved in a solvent mixture consisting essentially of ethylene carbonate and 1:2-propylene carbonate and containing 30–90% by weight of ethylene carbonate.

2. Solutions of acrylonitrile polymers which are capable of being cooled to temperatures below 35° C. before solidifying, which comprise a fibre forming acrylonitrile polymer having an acrylonitrile content at least 85% by weight, dissolved in a solvent mixture consisting essentially of ethylene carbonate and 1:2-propylene carbonate and containing 30–90% by weight of ethylene carbonate.

3. Solutions of acrylonitrile polymers which are capable of being cooled to temperatures below 18° C. before solidifying, which comprise a fibre forming acrylonitrile polymer having an acrylonitrile content at least 85% by weight, dissolved in a solvent mixture consisting essentially of ethylene carbonate and 1:2-propylene carbonate and containing 55–80% by weight of ethylene carbonate.

4. Solutions of acrylonitrile polymers which are capable of being cooled to temperatures below 18° C. before solidifying, which comprise a fibre forming acrylonitrile polymer having an acrylonitrile content at least 95–100% by weight, dissolved in a solvent mixture consisting essentially of ethylene carbonate and 1:2-propylene carbonate and containing 55–80% by weight of ethylene carbonate.

5. Compositions according to claim 3, wherein the viscosity of the polymer measured in 1% solution in dimethylformamide at 20° C. is between 2.5 and 4.5 centistokes and its concentration in the composition is 8–17.5% by weight, and the solvent mixture contains 60–75% by weight of ethylene carbonate.

6. Compositions according to claim 4, wherein the viscosity of the polymer measured in 1% solution in dimethylformamide at 20° C. is between 2.5 and 4.5 centistokes and its concentration in the composition is 8–17.5% by weight, and the solvent mixture contains 60–75% by weight of ethylene carbonate.

7. A process for producing a solution of an acrylonitrile polymer which is capable of being cooled below 35° C. before solidifying, which comprises maintaining an acrylonitrile polymer having an acrylonitrile content of at least 85% by weight in contact with a solvent mixture consisting essentially of ethylene carbonate and 1:2-propylene carbonate and containing 30–90% by weight of ethylene carbonate at a temperature above 70° C. until a clear solution is formed.

8. A process for producing a solution of an acrylonitrile polymer which is capable of being cooled below 18° C. before it solidifies, which comprises maintaining a fibre-forming acrylonitrile polymer containing at least 85% by weight of acrylonitrile in contact with a solvent mixture consisting essentially of ethylene carbonate and 1:2-propylene carbonate and containing 55–80% by weight of ethylene carbonate at a temperature of 70–80° C. until a clear solution has been formed.

9. Process according to claim 8, wherein the viscosity of the polymer measured in 1% solution in dimethylformamide at 20° C. is between 2.5 and 4.5 centistokes, and the solvent mixture contains 60–75% by weight of ethylene carbonate, and is present in amount such that the resulting solution contains 8%–17.5% by weight of the polymer.

10. Process for the manufacture of filaments, films and like shaped articles of acrylonitrile polymers, which comprises shaping a solution of a fibre-forming acrylonitrile polymer having an acrylonitrile content of at least 85% by weight in a solvent mixture consisting essentially of ethylene carbonate and 1:2-propylene carbonate and containing 30–90% by weight of ethylene carbonate, and setting the shaped solution by means of a coagulating liquid.

11. Process according to claim 10, wherein the coagulating liquid is an aqueous solution of any alkylene glycol.

12. Process according to claim 10, wherein the coagulating liquid is an aqueous solution of a polyalkylene glycol.

13. Process according to claim 10, wherein the coagulating liquid is an aqueous solution of glycerol.

14. Process according to claim 10, wherein the coagulating liquid is a carboxylic ester of boiling point above 250° C.

References Cited in the file of this patent

UNITED STATES PATENTS 2,601,255     Bruson _____ June 24, 1952

FOREIGN PATENTS 896,083     France _____ Apr. 17, 1944